United States Patent [19]

Dietzel et al.

[11] 3,747,943
[45] July 24, 1973

[54] DEVICE FOR PACKING A SHAFT PASSING THROUGH A WALL

[75] Inventors: Walter Dietzel; Siegfried Matusch; Uwe Hemminghaus, all of Braunschweig, Germany

[73] Assignee: Braunschweigische Maschinenbauanstalt, Am Alten Bahnhof, Germany

[22] Filed: June 23, 1972

[21] Appl. No.: 265,428

[30] Foreign Application Priority Data

Feb. 23, 1972 Germany .................. P 22 08 407.7

[52] U.S. Cl. ..................... 277/30, 277/97, 277/32
[51] Int. Cl. ............................................. F16j 15/16
[58] Field of Search ................... 277/12, 30, 32, 97

[56] References Cited
UNITED STATES PATENTS 1,897,937  2/1933  Joyce .................................. 277/32
1,990,519  2/1935  Bilelow et al. ...................... 277/32
3,666,276  5/1972  Hubler ................................ 277/30

FOREIGN PATENTS OR APPLICATIONS 953,474  3/1964  Great Britain ....................... 277/30

Primary Examiner—George E. Lowrance
Assistant Examiner—Robert I. Smith
Attorney—Wolfgang G. Fasse

[57] ABSTRACT

A shaft sealing device includes a corrugated pipe extending from a wall through which the shaft extends, the corrugated pipe also being affixed to a bushing carrying a bearing. A swivel support for the bushing is provided by bolts mounted in swivel bearings between the wall and flange. Plastic balls may be inserted in the cavity between the corrugated pipe and the shaft.

9 Claims, 4 Drawing Figures

DEVICE FOR PACKING A SHAFT PASSING THROUGH A WALL

BACKGROUND OF THE INVENTION

This invention relates to a device for packing a shaft passing through a wall which carries a packing. The invention is particularly directed to an arrangement having a rod packing in a bushing, which is connected with the wall by a corrugated pipe compensator and which is secured against turning.

It is frequently very difficult to pack highly loaded shafts having a large diameter when passing through a wall. The shafts will be flexibly deformed under the influence of high loads and may consequently run out of center. Due to large economic expenditure required, which is unjustifiable, it is impossible in most cases to machine shafts having a large diameter with sufficient accuracy to achieve a concentric run. Thus, at the spot where such a shaft is packed, radial deflections of several millimeters were necessarily accepted, depending on the shaft diameter and the load.

Packings such as rod packings in particular are, in general, accommodated in bushings which must be secured in relation to the wall through which the shaft passes so that the packings are unable to turn with the shaft even though there is frictional coupling with the shaft. These bushings then are inflexible against axial as well as radial deflections of the shaft due to the kind of fastening employed. There is no packing material or rod packings which, in such an inflexibly supported bushing, would be able to endure the extremely high mechanical strains resulting from shaft deflections of several millimeters without damage. In addition, deformations of the packings or rod packings occur to such an extent that faultless packing is no longer guaranteed.

In order to overcome the above difficulties shown, it has been proposed to connect the bushing for the packing or the rod packing to the wall through which the shaft passes by means of a corrugated pipe compensator. Due to the flexibility of the corrugated pipe compensator the bushing may follow the deflections of the shaft. It joins the shaft in its concentric run and thus prevents the packing or rod packings from being extremely strained or deformed.

A high friction occurs between the packing and the shaft, particularly between the rod packing and the shaft, so that the packings or rod packings, and also the bushing will be subjected to a high torque when turning the shaft. The corrugated pipe compensator is unable to absorb and to overcome this torque. If the shaft is in a perpendicular position, the true specific weight of the bushing with the packing or rod packing constitutes another force component, which cannot be absorbed and overcome by the corrugated pipe compensator. Therefore, connections must be provided between the bushing and the wall through which the shaft passes so that the torque and the forces resulting from the true specific weight of the shaft when it is installed perpendicularly may be overcome. Until now it has been impossible to shape these connections so that they do not obstruct the motion of the bushing but dissipate the forces reliably. The connections generate forces of reaction loading the packings and rod packings to an unwanted extent.

OBJECTS OF THE INVENTION

It is therefore an object of this invention to avoid these disadvantages and to construct a device in the above mentioned manner so that the bushing with the packings or rod packings will be supported without any detrimental forces of reaction against the torque resulting from friction and, if necessary, against the true specific weight.

SUMMARY OF THE INVENTION

In accordance with the present invention, the above object is attained by equipping the bushing with a flange which is connected to the wall by several bolts. The bolts are mounted to swivel to a limited extent in relation to the wall and the flange. In addition several roller brackets are distributed at the circumference of the flange, the rolls of which run on the shaft.

The bushing is connected to the wall via bolts in the device according to the invention. The limited sluability of the bolts in their ends is the prerequisite for the bushing to be moved in relation to the wall. The roller brackets are distributed about the flange with the rollers running on the shaft whereby the rollers continuously center the bushing relative to the shaft so that the bushing, when the shaft rotates continuously, follows any deflections. Thus, the packing or rod packing is protected against unwanted loads. The force reactions resulting from the only limited flexibility of the bolts are removed by avoiding the packing or rod packing via the roller brackets and rolls.

By employing the device according to the invention it has been possible for the first time to pack shafts of any diameter while maintaining a high durability of the packings or rod packings to a reliable and leakproof extent when radial deflections of the shaft cannot be avoided.

In order to center the bushing with the packing or rod packing accurately to the shaft, it is advantageous if the roller brackets are adjustable radially to the shaft.

Diffusion towers for extraction of beet pulp are equipped with an internal perpendicular transporting shaft. The above mentioned difficulty in packing a highly loaded shaft having a large diameter occurs in such a diffusion tower if the transporting shaft is driven from the lower end of the diffusion tower. With this type of drive the transporting shaft must pass through the bottom of the diffusion tower in a leakproof manner. The packing must be absolutely reliable, for, if the operation of the diffusion tower would have to be stopped due to leakage, a considerable part of the sugar factory would also have to stop working. If such a diffusion tower is equipped with the above mentioned device in accordance with the invention, operational difficulties of this type wll no longer occur.

In sugar industry the juice must be prevented from stagnation as bacterial life may develop quickly in the slack juice. Sugar is decomposed by means of bacterial processes, so that sugar losses result. Furthermore, due to bacterial processes the pH index of the sugar juices changes so that corrosion will ensue at the structural components of the apparatus.

If a diffusion tower is equipped with a packing device the cavity between the shaft and the corrugated pipe compensator might become dangerously infectuous when it it filled with juice.

This disadvantage, however, may be eliminated in accordance with the invention by providing a cavity between the shaft and the corrugated pipe compensator of a device to pack the pass of a bottom driven shaft at the bottom part of a diffusion tower, for example, and by filling this cavity with balls, preferably plastic balls.

These balls occupy most of the volume of the cavity so that the cavity only contains a small quantity of juice. In addition, the balls move when the shaft rotates, they roll upon one another, on the shaft and at the walls of the corrugated pipe compensator and thus, they keep the juice moving. The balls also support the corrugated pipe compensator in relation to the shaft. They effect the function of a fluid medium. It is of special advantage to use balls that are filled with a medium under pressure, such as pressurized air or a liquid like water.

In a further development of the invention the corrugated pipe compensator is provided with a valve acting as sluice for putting in the balls.

It is also advantageous if a discharge line with a shut-off valve is provided at the lowest spot of the cavity between the shaft and the corrugated pipe compensator. At the end of a run, it is possible by means of this pipe not only to discharge the juice of the cavity but also to rinse it for cleaning purposes.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
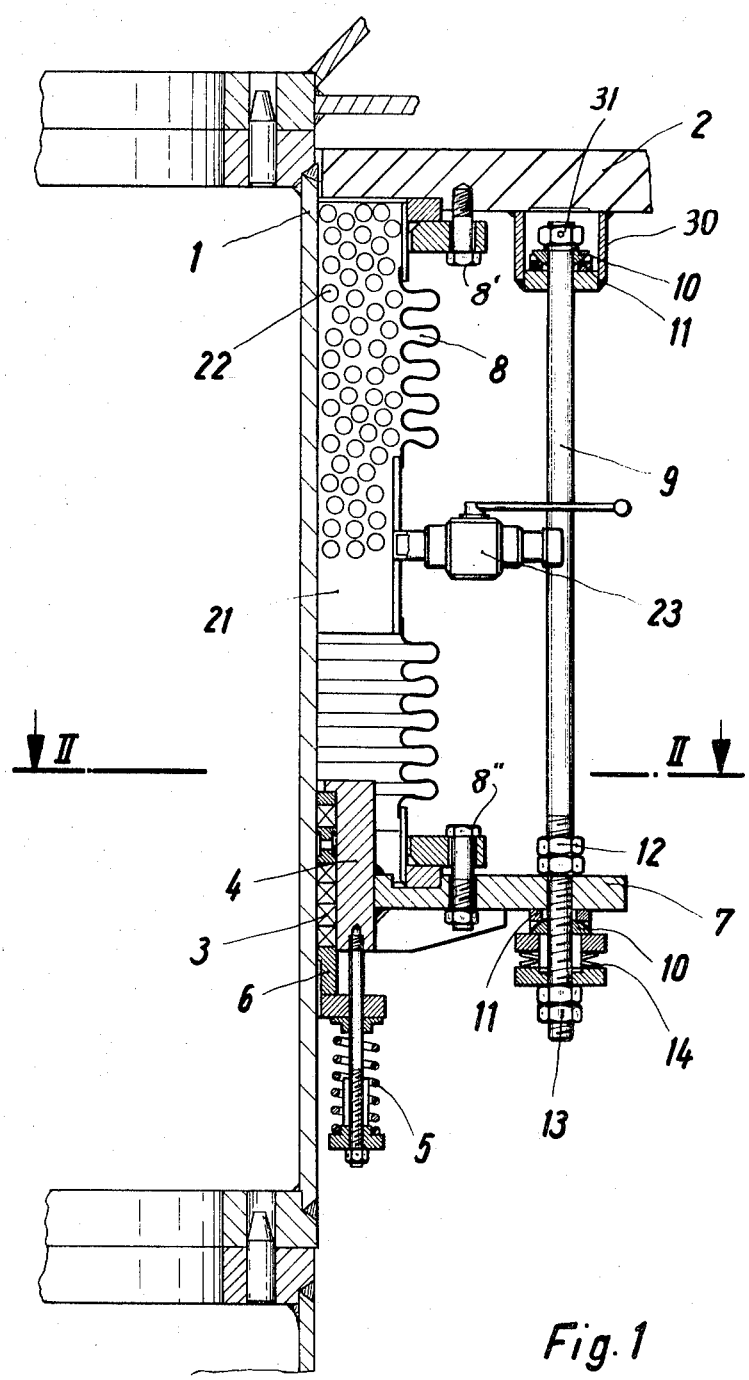
FIG. 1 is a cross sectional view of a portion of a packing device in accordance with the invention, the view illustrating the half of the device to the right of the shaft of a machine, such as a sugar diffusion tower.

Referring now to FIG. 1 there is shown a shaft 1 which passes through a wall 2 with enough diametrical clearance that the shaft 1 may have large radial deflections which may be due to tolerances or which may result from high loads. As an example, the arrangement according to the invention may be employed as the sealing device for a sugar recovery system. However, the invention is not limited to such use. A rod packing 3 is provided in a busing 4 beneath the wall and serves as leakproof packing of the shaft 1. A compression spring 5 with a pressure ring 6 permanently loads the rod packing 3 with pressure in the axial direction and hence in a bulged state. Thus, the rod packing 3 remains in permanent sealing contact with the outer surface of shaft 1.

Figure 2:
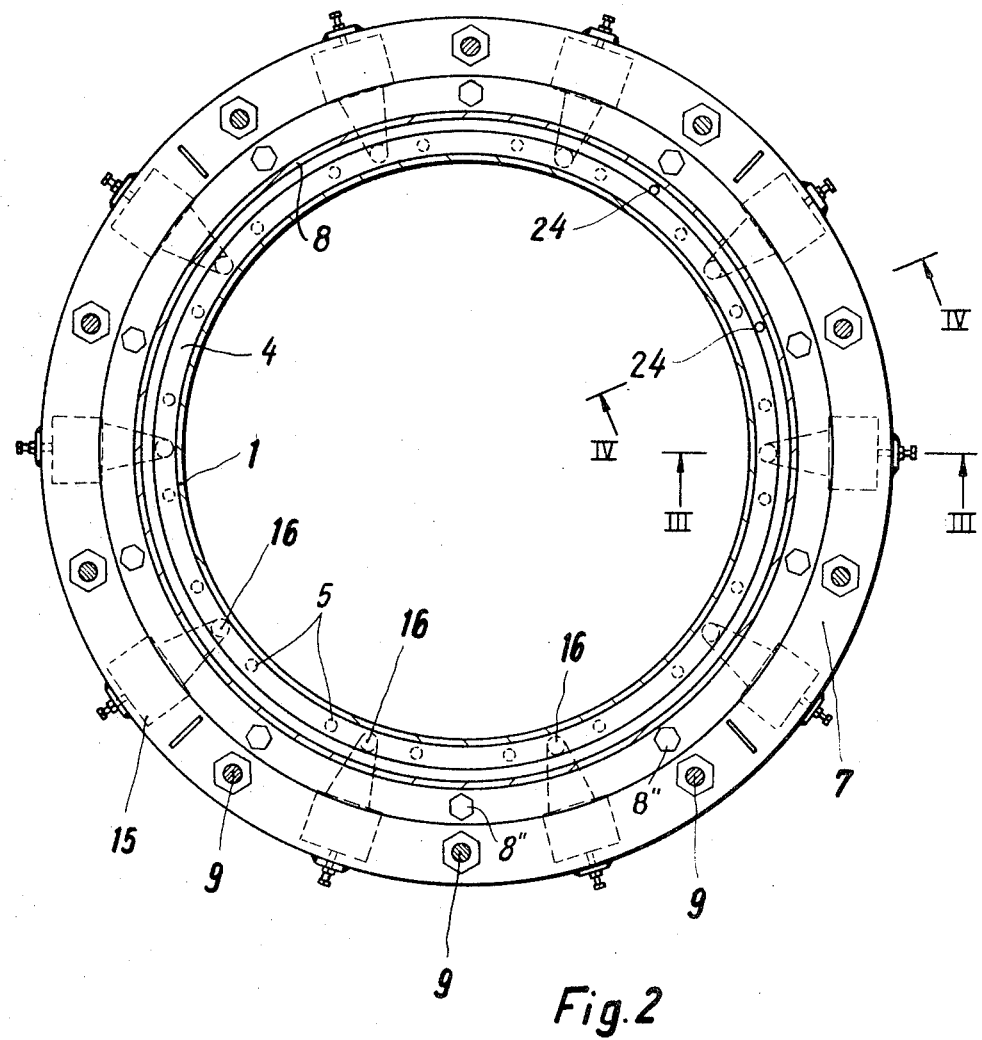
FIG. 2 is a cross sectional view of a complete device according to the invention, taken along the sectional plane running along the line II—II of FIG. 1.

A flange 7 is secured to the outer circumference of the bushing 4. A corrugated pipe compensator 8 extends between the flange 7 and and the wall 2. The pipe compensator 8 is secured to the wall 2 by means 8′ and the flange 7 by means 8″. The corrugated pipe compensator is sealed to the wall 2 and the flange 7 and forms a liquid-impermeable connection between the wall 2 and the bushing 4. The compensator 8 allows for radial and axial movements of the bushing in relation to the wall 2. Due to friction between the rod packing 3 and the shaft 1, the bushing 4 will be loaded with a torque when the shaft rotates. The corrugated pipe compensator 8 is unable to absorb this torque. In addition, it must be relieved from forces due to the weight of the bushing 4. The flange 7 is therefore also connected to the wall 2 by means of bolts 9 externally of the compensator. The lower ends of the bolts 9 extend through apertures in the flanges 7, and the upper ends thereof extend into support members 30 affixed to the bottom of the wall 2. A step bearing 11 is assembled on each end of the bolts 9 bearing on the plate 7 and the support member 30 respectively, and a ball type pressure ring 10 is assembled contacting each step bearing. A nut 31 is provided at the top of the bolt 9, and locking nut arrangements 12 and 13 are provided at the bottom of the bolts 9, above the flange 7, and below the lower pressure ring 10, with plate springs 14 being provided between the lower ring 10 and the locking arrangement 13. The pressure rings 10 and the step bearings 11 act together in the manner of ball bearings and permit limited swivel movements of the bolts 9, which are executed at the top end in relation to the wall 2 and the bottom end in relation to the flange 7. At their bottom ends, the bolts 9 are connected to the flange 7 in a backlash free manner by means of the arrangements 12 and 13 and plate springs 14. FIG. 2 shows that a large number of bolts 9 is distributed on the circumference of the flange 7.

Figure 3:
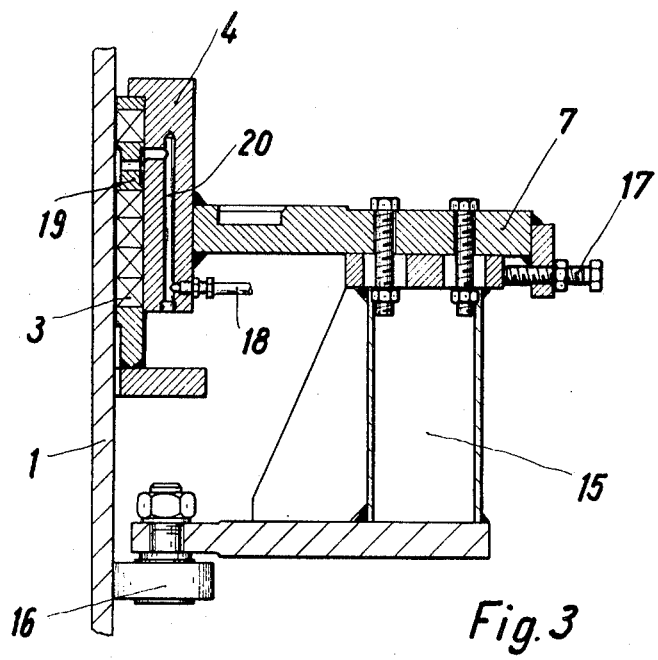
FIG. 3 is a cross sectional view of a portion of the device of FIG. 2 taken along the lines III—III of FIG. 2.

Referring to FIGS. 2 and 3, several roller brackets 15 are secured at the bottom side of flange 7. These are distributed in intervals on the circumference of the flange and may be adjusted in radial direction to the shaft by suitable adjusting screws as shown. The roller brackets 15 carry rolls 16, which run at the outer surface of the shaft 1, when the shaft rotates. The roller brackets 15 may be used for the purpose of centering the bushing 4 with the rod packing 3 exactly to the shaft 1 by means of setscrews 17. As soon as this centering is effected, the rolls 16 run on the outer surface of the shaft and maintain the bushing and the rod packing continuously concentric to the shaft 1. The bushing 4 follows all radial deflections of the shaft and the rod packing 3 will be thus protected against unwanted loads.

An oil ring 19 is assembled in the bushing 4 which is connected to a lubricating pipe 18 via lubrication channels 20, as shown in FIG. 3.

Referring again to FIG. 1 there is a cavity 21 between the inner surface of the corrugated pipe compensator and the outer surface of the shaft 1 into which juice may enter from the top due to the radial clearance between the shaft and the wall 2. In order to reduce the volume of juice in the cavity 21, this cavity 21 is filled with balls 22. These balls, however, also support the corrugated pipe compensator against the shaft 1. They act like a pressure medium against contracting forces which try to squeeze the corrugated pipe compensator against the shaft. In the example shown, the balls are hollow and filled with a medium under pressure. It is advantageous if the balls consist of polypropylene and polyethylene. A valve 23 is connected to the corrugated pipe compensator and is shaped as a sluice in order to enable insertion of the balls 22 in the cavity 21.

Figure 4:
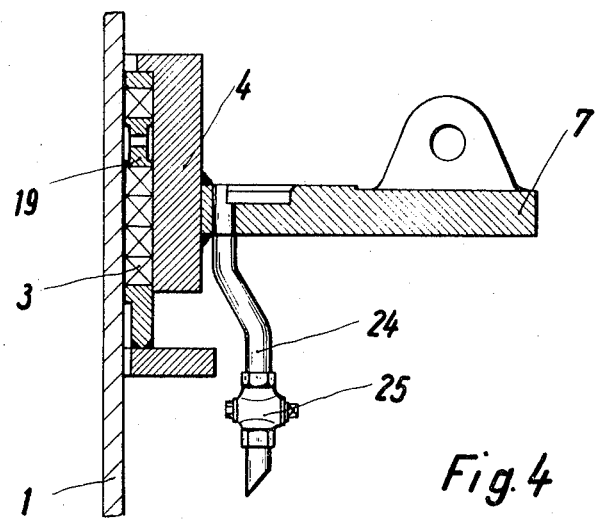
FIG. 4 is a cross sectional view of a portion of the device of FIG. 2 taken along the lines IV—IV of FIG. 2.

A discharge line 24 with a gate valve 25 is connected at an appropriate spot of the flange 7 as shown in FIG. 4. Juice in the cavity 21 may be discharged when the valve 25 is opened by means of this line. Rinsing and cleaning liquids also may be run off by means of this discharge line.

Although the invention has been described with reference to specific example embodiments, it is to be understood, that it is intended to cover all modifications and equivalents within the scope of the appended claims.

What is claimed is:

1. In an arrangement for packing a shaft passing through a wall, wherein a bushing surrounds the shaft and carries a shaft packing material connected to the wall by a corrugated pipe compensator means, the improvement comprising a flange means connected to the bushing, sluable bolt means connected between said flange means and the wall for permitting limited movement of said bushing with respect to said wall, and a plurality of roller means positioned to ride on said shaft, said roller means being affixed to said flange means for maintaining concentricity between said shaft and said bushing.

2. A sealing arrangement for a shaft, comprising a wall, said shaft extending through said wall, a flange means surrounding said shaft and spaced from said wall, packing means on said shaft, means on said flange means for holding said packing means, corrugated pipe compensator means sealingly extending between said flange means and said wall, bolt means extending between said flange means and said wall and being mounted to permit limited movement of said flange means with respect to said wall, and roller means mounted on said flange means and positioned to ride on said shaft for continuously maintaining said flange means concentric with said shaft.

3. The sealing arrangement of claim 2, comprising means for adjusting the radial position of said roller means with respect to said shaft.

4. The sealing arrangement of claim 2, wherein said shaft is vertical and said flange means is below said wall, whereby the space between said corrugated pipe conpensator and shaft comprises a cavity, said arrangement further comprising a discharge line connected to the lowest point of said cavity, and shut-off valve means in said discharge line.

5. The sealing arrangement of claim 1, comprising a plurality of balls filling the space between said shaft and said corrugated pipe compensator.

6. The sealing arrangement of claim 5, wherein said balls are plastic balls.

7. The sealing arrangement of claim 6, wherein said balls are filled with a pressurized medium.

8. The sealing arrangement of claim 5, further comprising valve means connected to said corrugated pipe connector to enable filling of said space with said balls.

9. A packing system for use between a shaft and a wall through which the shaft passes, said system being adapted to prevent leakage of a liquid body located on one side of said wall, and comprising a bushing surrounding said shaft adjacent to said wall, packing material held by said bushing against said shaft, a flange surrounding said shaft and connected to hold said bushing, a corrugated pipe compensating means sealingly extending between said flange and said wall and forming a cavity between said shaft and compensating means, a plurality of aligned swivel mounts on said wall and flange outside of said cavity, bolt means extending between said swivel mounts on said wall and flange for permitting limited movement of said bushing, roller means affixed to said flange and having rollers riding on said shaft for maintaining said bushing concentric with said shaft and ball means in said cavity for limiting the amount of said liquid which can enter said cavity.

* * * * *